(No Model.)

C. NERACHER, Dec'd.
O. J. FREY, Administrator.
STRUT.

No. 538,740. Patented May 7, 1895.

Attest
Walter Donaldson
F. L. Middleton

Inventor
Charles Neracher
by Ellis Spear
Atty.

UNITED STATES PATENT OFFICE.

CHARLES NERACHER, OF CLEVELAND, OHIO; OTTO J. FREY ADMINISTRATOR OF SAID NERACHER, DECEASED.

STRUT.

SPECIFICATION forming part of Letters Patent No. 538,740, dated May 7, 1895.

Application filed May 29, 1894. Serial No. 512,880. (No model.)

*To all whom it may concern:*

Be it known that I, CHARLES NERACHER, a citizen of the United States of America, residing at Cleveland, in the county of Cuyahoga and State of Ohio, have invented certain new and useful Improvements in Struts, of which the following is a specification.

My invention relates to the means for holding the valves of automatic sprinklers to their seats such means being known as "struts" and it is my object to provide a strut which while being highly sensitive and positive in action will be firm in structure and securely locked in place when the parts thereof are combined with the fusible solder designed to hold them in normal position.

Figure 1:
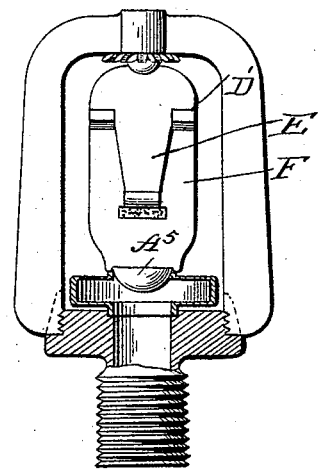
Figure 2:
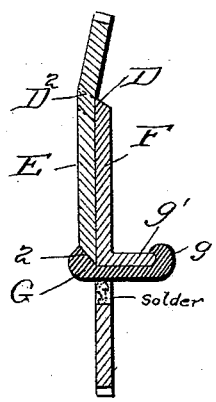
Figure 3:
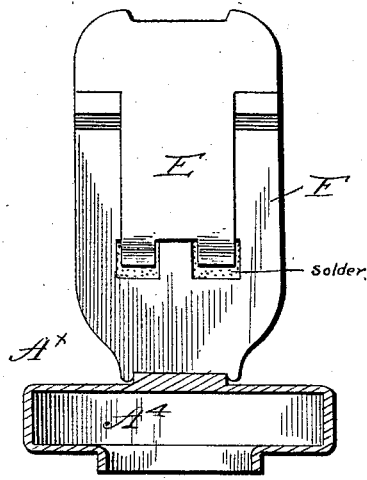

In the accompanying drawings, Figure 1 is a face view of one form of my strut in place; Fig. 2, a sectional view of the same. Fig. 3 is a view, similar to Fig. 1, of a modification, and Fig. 4 a sectional view thereof.

Referring to Figs. 1 and 2, the strut comprises two parts E F, the latter of which has laterally extending inclined prongs or lugs D between which and against the face of the part F, the central body part or extension of the part E lies, said part E having bearing shoulders D' with inclined edges $D^3$ adapted to bear on the incline of the lugs by which the said part E is directed to its seat on the part F and is kept from slipping off of the same. The upper part of E is bent over to bring its upper bearing end over the part F and to throw the said bearing out of line with the bearings $D^2$ D, so that when the solder melts there will be a quick pivotal action on the lugs D between the two parts E F. The lower end of the part E has a locking piece adapted to pass laterally through an opening in the part F and be held by solder. In the present instance this locking piece G is formed separate from the part E, its end $g$ being hooked to engage a projection $g'$ on the part F opposite to the part E. The locking piece passes through the opening from this hooked bearing and it has a beveled or inclined bearing 2 engaging a corresponding incline on the lower end of the part E. The opening below the locking piece is filled with solder fusible at the proper temperature. By reason of this construction the locking piece will be held up so long as the solder remains intact but as soon as the solder begins to melt the pivotal tendency of the parts at the lugs D causes them to separate at the locking piece and the incline bearing on the part E working against the incline on the locking piece forces the same down, crushing the softened solder and finally becoming free from the locking piece so that the two parts will fall away from each other and the valve thus released. The incline bearing is of importance owing to the crushing effect it has on the solder which thus is forced down and permits the quick release of the part E from the locking piece.

Figure 4:
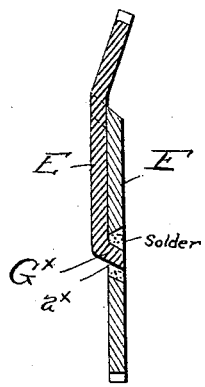

In the other form of the invention shown in Figs. 3 and 4 the two parts are pivotally connected with each other in the manner before described, the only difference being in the lock. In this case the said locking piece instead of being formed separate from the part E' forms an integral part thereof extending through an opening in the part F' in inclined position. The locking extension is marked $G^x$ in this form and the inclined bearing $2^x$. This inclined bearing contacts with the solder and the clinching effect is secured here as in the previous case. In both instances the solder does not hold simply by its adhesion to the parts but by its peculiar arrangement in combination with the incline bearing, a wedge effect is secured and the solder would have to be crushed down before the parts would separate under normal conditions. In the form last described, the opening through the part F' is conical, the small end of the opening being toward the part E' and thus the incline of the opening is parallel with the incline of the locking extension. As shown in Fig. 3 I prefer to use two of these integral locking extensions. These locking extensions pass through two openings in the main part similar to the wedge shaped opening before described. I do not however wish to limit myself to any particular number of openings or prongs.

The two part struts shown in Figs. 3 and 4 are intended for use with a flexible diaphragm or valve, such as shown at $A^x$, this having a closed top, an open bottom and an expansion chamber at $A^4$. The three part form of strut shown in Figs. 1 and 2 is intended to be used with the form of flexible diaphragm shown in Fig. 1 which has upper and lower openings and which is combined with a supplemental valve $A^5$ closing the upper opening, this being similar to the diaphragm and valve shown in my application filed April 6, 1894, and the first mentioned diaphragm is similar to that described in my application of February 23, 1894.

It will be noticed that the lock for the strut in both instances comprises as its main features the solder in an opening of one part combined with an inclined bearing arranged to exert a crushing effect thereon.

The lock in Figs. 1 and 2 comprises the piece separate from the part E but forming an extension therefrom through the opening whereas in Figs. 3 and 4 the lock comprises the integral extension.

I claim as my invention—

1. In combination in a strut, the part F having at its upper end a laterally extending bearing, the part E arranged alongside the part F and engaging the upper lateral bearing and having an upper bent end extending into the plane of the part F and the solder connection between the parts, substantially as described.

2. In combination in a strut, the two parts E F one of which has pivotal bearing lugs at its upper end bent aside and the other having bearings engaging therewith said latter part having an extension lying along the face of the part F and an upper extension beyond the bearing lug and the solder connection between the parts, substantially as described.

3. In combination in a strut, the two parts E F, the lugs bent laterally from the part F and having inclined bearing surfaces, the inclined bearings on the part E and the fusible solder connection between the parts, the said part E having an extension both above and below the inclined bearing the latter of which is secured to the part F by the said solder joint, substantially as described.

4. In combination in a strut, the two parts, and the lock between the same comprising the solder in the opening of one part and the inclined bearing arranged to crush the said solder, substantially as described.

5. In combination in a strut, the two parts, one of which has an opening with solder therein and the other part having an extension with an inclined bearing passing through the said opening and engaging the solder, substantially as described.

6. In combination in a strut, the two parts, one of which has an opening with solder therein, said opening being of conical form and the other of said parts having an inclined extension passing through the said opening and engaging the solder therein, substantially as described.

7. In combination in a strut, the two parts pivotally engaging each other, one of said parts having an opening with solder therein and the other part having a locking extension passing through the said opening and engaging the solder, substantially as described.

8. In a strut, the combination of the two parts E F, the said part E having an inclined locking piece passing through an opening in the part F, said opening being conical in form with the small end toward the part E and the solder in said opening, substantially as described.

9. In combination, the strut composed of two parts one of which has an opening with beveled walls and the other part extending in said opening and the fusible solder between the same and the beveled walls, substantially as described.

In testimony whereof I affix my signature in presence of two witnesses.

CHAS. NERACHER.

Witnesses:
F. J. ELLSWORTH,
W. L. COOKE.